2 Sheets. Sheet 1.

B. Tinkham,

Wheel Cultivator.

No. 4231. Reissued Jan. 10. 1871.

Witnesses:
Phil T. Dodge
L. A. Allen

Inventor:
Benj. Tinkham
by Dodge & Munn
his attys

2. Sheets. Sheet 2.

B. Tinkham,

Wheel Cultivator.

No. 4,231. Reissued Jan. 10. 1871.

Witnesses:

Phil. T. Dodge

S. D. Allen

Inventor:

Benj. Tinkham by Dodge & Munn his Attys

United States Patent Office.

BENJAMIN TINKHAM, OF CAMERON, ASSIGNOR TO HAPGOOD & CO., OF CHICAGO, ILLINOIS.

Letters Patent No. 30,897, dated December 11, 1860; reissue No. 4,231, dated January 10, 1871.

IMPROVEMENT IN CULTIVATORS.

The Schedule referred to in these Letters Patent and making part of the same.

*To all whom it may concern:*

Be it known that I, BENJAMIN TINKHAM, of Cameron, in the county of Warren and State of Illinois, have invented certain new and useful Improvements in Cultivators; and I do hereby declare that the following is a full, clear, and exact description thereof, reference being had to the accompanying drawing making part of this specification and to the letters of reference marked thereon, like letters indicating like parts wherever they occur.

To enable others skilled in the art to construct and use my invention, I will proceed to describe it.

My invention relates to implements used for cultivating growing crops, such as corn, potatoes, &c.; and The invention consists in a novel construction of the implement, whereby, while the front end of the beams are supported and guided by an axle mounted on two wheels, their rear ends, with the shovels attached, can be moved laterally, and also vertically, either together or separately, and, at the same time, are held by the joint in an upright position, and kept from tipping or canting over sidewise; and whereby, also, they may be adjusted both laterally and vertically, and can also be suspended upon the frame clear of the ground when the implement is being moved to and from the field, all as hereinafter more fully explained.

Figure 1:
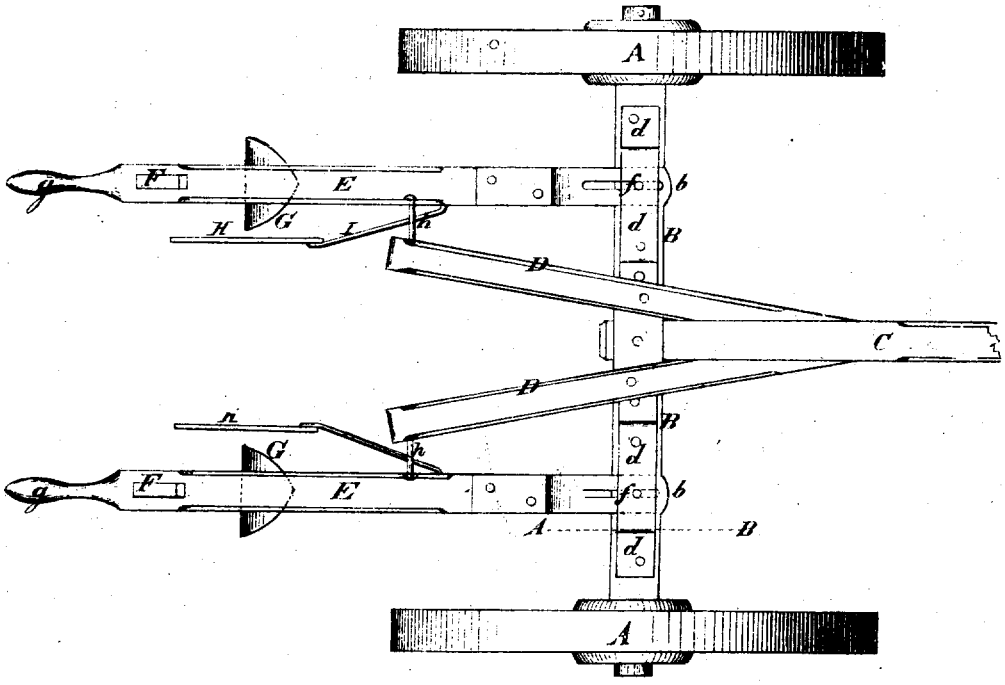

Figure 1 is a top plan view, and

Figure 2:
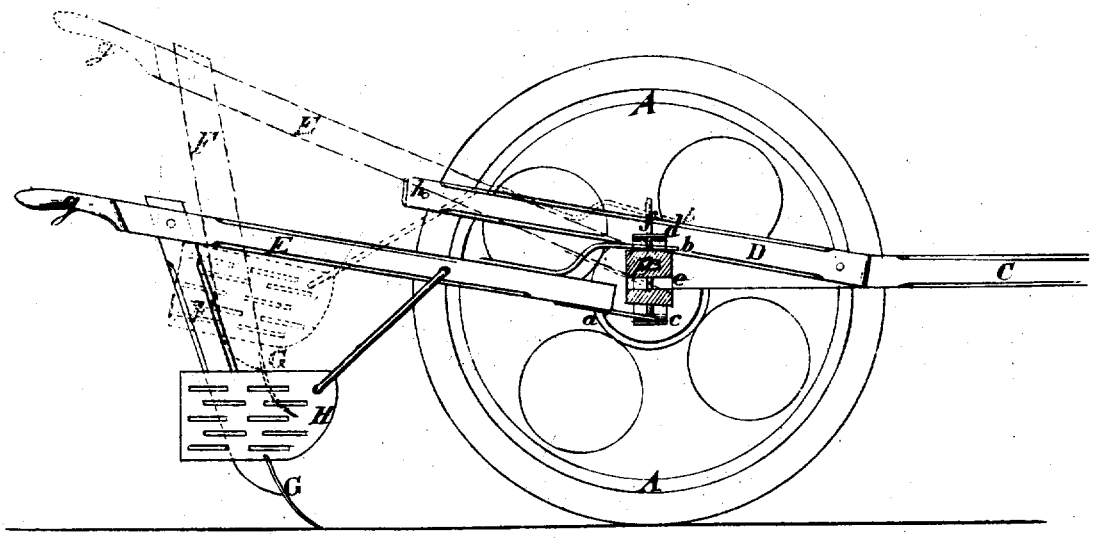

Figure 2, a longitudinal vertical section of a cultivator embodying my improvements.

In constructing a cultivator according to my plan I take an axle, B, and mount it on two wheels A, like a cart.

To this axle B I secure a tongue, C, by a rigid connection, and brace the tongue to the axle by means of two diagonal bars or braces, D, which have their rear ends projecting some distance behind the axle, as shown in figs. 1 and 2.

At their rear ends these bars D are each provided with a laterally-projecting pin, *h*, for the purpose of holding the beams E suspended when the shovels are raised from the ground, as represented by the dotted lines in fig. 2.

In the beam B, on each side of the tongue, I make a horizontal slot or mortise, *e*, as shown in section in fig. 2, said section being taken on the line A B of fig. 1.

To the upper side of the beam, over each slot *e*, I then secure a bent plate, *d*, this plate being secured at each end rigidly to the beam, but being raised clear of the beam between its ends, so as to make between it and the beam a space or slot similar to the slot *e* in the beam.

To the under side of the beam I also secure similar plates *c*, they being constructed and arranged in the same manner, except that they are underneath instead of above the beam, as shown in fig. 2.

Through these plates and the axle I make a series of vertical holes of proper size to receive a pin or bolt, *f*, as shown in fig. 2.

I then provide two beams, E, of suitable size to attach the shovels G to in the usual manner; and to the front end of each beam I secure two plates *a* and *b*, as shown in figs. 1 and 2.

These plates are long enough and of proper size to fit loosely in the slots in the beam and those between the beam and the plates *c* and *d*.

The upper plate *b* is provided with a longitudinal slot, as shown in fig. 1, of proper width to receive the pin *f*, and the lower plate *a* is provided with a hole, also of suitable size to receive the pin *f*.

The beams are connected to the axle by inserting the plates *a* and *b* into the slots, as shown in fig. 2, and then putting the pin *f* down through the holes in the plates *a* and *b*, and also through the holes in the plates *c d* and axle B, thus hinging or pivoting the beams to the axle at their front ends. When thus attached, the beams can be swung or moved laterally at their rear ends, they turning on the pin *f* freely.

By means of the slot in the upper plate *b* they can also be raised vertically at their rear ends, the slot in said plate permitting the same to play forward and backward on the pin *f*, as the rear end of the beams are raised or lowered, as represented by the dotted lines in fig. 2. At the same time, while the beams have these free lateral and vertical movements, they are held firmly in an upright position, and prevented from tipping, twisting, or canting over sidewise; and thus the necessity of uniting the two beams by cross-ties, braces, or frames of any kind, to keep them upright, is dispensed with.

By means of the series of holes for the pins *f*, the beams can be adjusted laterally, to suit rows of various widths; and by inserting the plates *a* and *b* in the different slots of the axle, their front ends may be raised or lowered, and thus the shovels made to run deeper or shallower, as desired.

Alongside of the shovels G are secured shields or guards H, which are provided with slots or openings, through which the finer particles of soil may pass to the plants, while the lumps, clods, or coarser portions are kept from falling on the young plants and injuring or burying them.

The beams and handles may be made in any of the usual forms, and two or more shovels may be attached to each beam.

It is obvious that, instead of the straight axle here shown, a curved or bent axle may be used, to pass over high plants, and that any suitable material may be used to form the various parts of the implement.

In using my improved cultivator the team is attached to the tongue C, and the implement so driven or drawn as to straddle a row of the plants, each beam E, with its shovels, thus passing between two rows, and stirring up the soil between them. The operator walks behind and guides the shovels by his hands, holding one handle *g* of a beam in each hand.

By this means he is able to move either plow or shovel to the right or left, as may be necessary to follow the sinuosities of the row, and prevent cutting or tearing up the plants that may happen to stand out of line, and also to run the shovels nearer to or further from the plants, as may be desired.

By means of the peculiar joint by which the shovels are held upright, the operator is greatly relieved, as all he has to do is simply to move them in or out to guide them aright, whereas he would otherwise be compelled to do this, and, at the same time, hold them upright by main force, which is extremely laborious and tiresome to the arms and wrists.

Having thus described my invention,

What I claim is—

1. The beams E, hinged or pivoted to the axle by a joint, substantially such as described, whereby the beams, with their shovels, have a free vertical and lateral movement, and still be held in an upright position, as herein set forth.

2. The rearwardly-projecting bars D, or their equivalents, for supporting the hinged beams above the ground, substantially as described.

3. The combination of the axle B, rigid tongue C, braces or bars D, and the hinged beams E, all arranged to operate substantially as and for the purpose herein set forth.

BENJAMIN TINKHAM.

Witnesses:
J. M. NICHOLSON,
L. A. STILSON.